Dec. 10, 1963 R. A. MATTHIESSEN 3,113,790
LEAKAGE INTERCEPTOR FOR PIPE COUPLINGS
Filed April 7, 1959 2 Sheets-Sheet 1

INVENTOR.
Roy A. Matthiessen
BY
Harry B. Cook,
ATTORNEY

Dec. 10, 1963   R. A. MATTHIESSEN   3,113,790
LEAKAGE INTERCEPTOR FOR PIPE COUPLINGS
Filed April 7, 1959   2 Sheets-Sheet 2
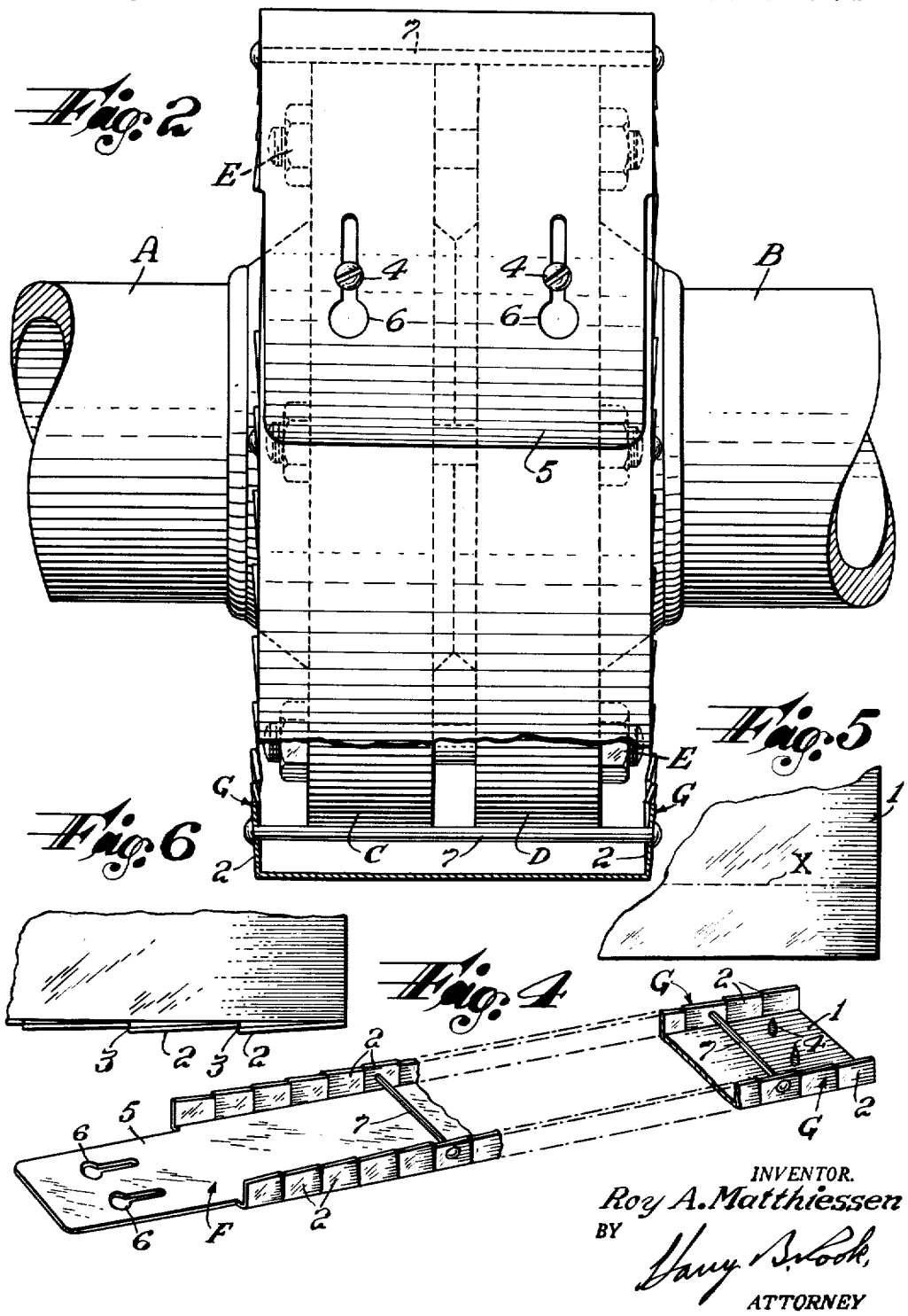
INVENTOR.
Roy A. Matthiessen
BY
Harry B. Cook,
ATTORNEY

United States Patent Office 3,113,790
Patented Dec. 10, 1963

3,113,790
LEAKAGE INTERCEPTOR FOR PIPE COUPLINGS
Roy A. Matthiessen, 30 Sandy Hill Road,
Westfield, N.J.
Filed Apr. 7, 1959, Ser. No. 804,618
3 Claims. (Cl. 285—45)

This invention relates in general to means for intercepting leakage of liquids, especially such leakage under pressure as might be incidental to the blowing of a gasket in a pipe coupling, so as to prevent spraying or splashing of the liquid over workmen or objects in the vicinity of the pipe coupling.

Many efforts have been made to produce a device such as a casing or a wrapper to be applied in surrounding relation to a joint or connection in a pipe line for collecting and preventing spraying of liquids from leaks in joints or connections in pipe lines, but these known devices leave much to be desired in that either they fail to function properly, or they are complicated and difficult to apply to and remove from a pipe coupling or joint, or they are too expensive.

A primary object of the present invention is to provide a safety shield that shall embody novel and improved features of construction whereby the shield can be easily and quickly applied to and removed from a pipe coupling and which shall provide adequate protection of persons and objects in the vicinity of the pipe coupling from liquid escaping from the coupling.

Another object is to provide such a shield which shall comprise a single strip of sheet material constructed with an elongate body portion and flanges angularly related thereto along its longitudinal edges so that it may be easily and quickly wrapped in encircling relation to a pipe coupling with its ends separably connected together, and means for holding the shield in approximately coaxial and spaced relation to the pipe coupling.

Other objects are to provide a shield of this nature which shall be simple and inexpensive in construction, and reliable and durable in operation; and to provide other advantages and results that will be brought out by the following description in conjunction with the accompanying drawings in which FIGURE 1 is a side elevational view of a shield embodying the invention applied to a flanged pipe coupling and with portions broken away and shown in section for clearness of illustration;

FIGURE 2 is a front elevational view of the shield as shown in FIGURE 1, with portions broken away and shown in section;

FIGURE 4 is a perspective view, on a reduced scale, of the shield before application thereof to a pipe coupling, with portions broken away;

FIGURE 5 is a fragmentary plan view of a portion of a strip of material showing the manner of slitting its longitudinal marginal portion preliminary to producing the shield flanges; and FIGURE 6 is an enlarged fragmentary plan view of the strip of material shown in FIGURE 5 illustrating the formation of the flange along the longitudinal edge of the strip.

For the purpose of illustration, the shield has been shown in conjunction with a known type of flanged pipe coupling that includes two pipe sections A and B that have secured thereto in the usual manner the respective flanges C and D that are separably fastened together by bolts E, each with one end face in liquid-tight abutting relation to the corresponding face of the other flange and generally with a gasket between the flanges.

Frequently, particularly in industrial plants, leaks occur in the joint between the flanges, and where liquid under high pressure is flowing through the coupling, the liquid is sometimes caused to squirt in a jet or stream under high pressure from a leak or weak spot in the joint, for example, upon blowing out of a portion of the gasket. It is the purpose of the present invention to provide a shield to protect persons and objects in the vicinity of such a leaking pipe joint from being struck, and possibly injured, by such escaping liquid.

Figure 1:
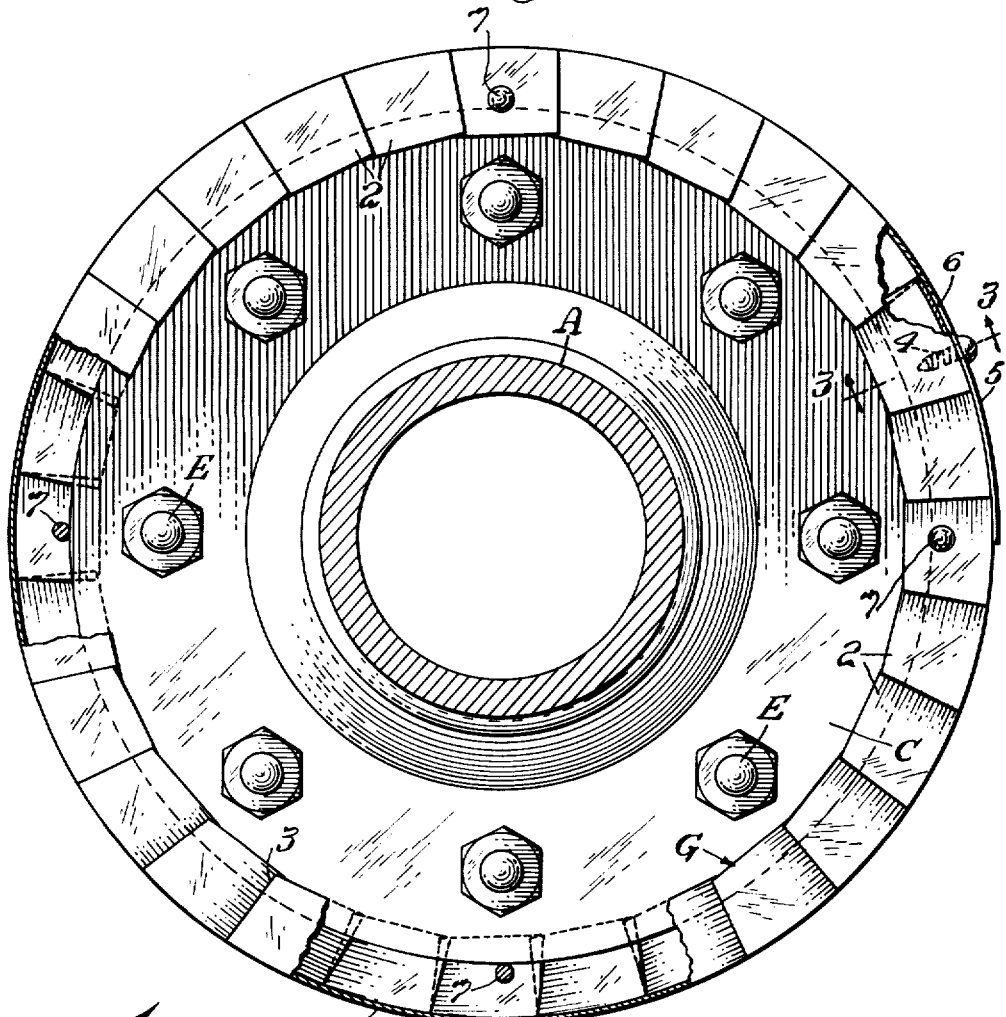

The shield embodying the invention constitutes a single flexible strip F of suitable material of a length adequate to encircle a given pipe coupling with its ends in overlapping relation and separably secured together, each longitudinal edge of the strip having a flange G extending throughout a portion of the length thereof adequate to completely encircle the pipe coupling. The shield is initially formed of a flat strip of material, such as sheet metal or a suitable synthetic resinous composition, preferably possessing some inherent resiliency, and each longitudinal margin or edge portion is bent along a longitudinal line X (FIGURE 5) into a position approximately perpendicular to the plane of the strip, thereby forming an elongated body portion 1 at each longitudinal edge of which is a flange which comprises a plurality of flange sections 2 that are formed by slitting the flange at equidistantly spaced points with each slit extending inwardly from the edge of the flange to the body portion 1 as shown in FIGURES 4 and 6. As shown, one edge of each section is offset from the juxtaposed edge of the next adjacent section as indicated at 3 so that the strip can be rolled into circular form with said edge portions of the flange sections in overlapping relation to each other as shown in FIGURES 1 and 2. When the strip is thus rolled, the flange sections complement each other in forming a continuous flange G at each longitudinal edge of the strip.

It will be understood that the strip will be of such a width, that is, the flanges G will be spaced apart such a distance, that they will be in spaced relation to the outer faces of the pipe coupling flanges as shown in FIGURE 2; and the flanges will be of any suitable width, but preferably such as to extend inwardly beyond the peripheries of the coupling flanges C and D.

The shield also has suitable means for separably connecting the ends of the strip to hold the shield in position on the pipe coupling, and as shown, two headed studs or screws 4 are secured adjacent one end of the strip while the other end portion of the strip projects beyond the flanges as indicated at 5 and has a keyhole slot 6 to cooperate with each screw.

The shield is also provided with means for holding the body portion 1 in coaxial spaced relation to the axis of the pipe coupling, and as shown, such means comprises a plurality of spacing rods 7, each of which has one end fixedly secured in one of the flanges G and extends transversely of the strip in spaced and approximately parallel relation to the body portion 1.

Figure 3:
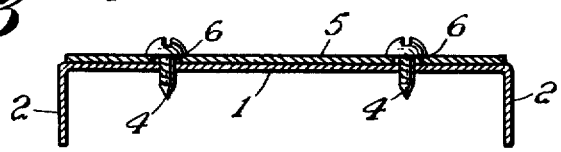
FIGURE 3 is a fragmentary longitudinal sectional view approximately on the plane of the line 3—3 of FIGURE 1.

From the foregoing, it will be understood that in the use of the invention, a shield comprising a strip of material of the proper length as shown in FIGURE 4, will be wrapped around the pipe coupling to be protected, with the spacing rods 7 in contact with the peripheral surfaces of the coupling flanges and with the end portions of the strip overlapping, the sections 2 of the flanges G automatically sliding into proper overlapping relation to each other as shown in FIGURE 1. Then the heads of the fastener elements 4 will be placed through the large ends of the keyhole slots 6, whereupon the overlapping end portions of the strip will be slid relatively to each other to cause the shanks of the fastener elements to slide into the narrow portions of the keyhole slots as shown in FIGURE 2, whereupon the fastener elements will be tightened, as by screwing them into the strip, as best shown in FIGURE 3, to clamp the two end portions of the strip together.

With this construction, it will be seen that should a leak under high pressure occur between the coupling flanges, the liquid will strike and be intercepted by the body portion 1 of the shield and be deflected laterally, either against the flanges G or over the edges of said flanges in an approximately horizontal direction. The leaking stream will thus be broken up into a mist in such a way as to avoid damage to an adjacent person or object, and a person or object directly in line with the joint between the coupling flanges will be protected against the leaking stream. Should the leak be a slow leak, the liquid will collect in the lower portion of the shield; and, if desired, a drain opening and drain pipe could be provided.

While the now preferred embodiment of the invention has been illustrated and described, it should be understood that this is primarily for the purpose of illustrating the invention, and that modifications or changes can be made in the construction and use of the shield, all within the spirit and scope of the invention.

What I claim is:

1. A leakage interceptor for a pipe joint having coupling flanges with circumferential surfaces, comprising a body portion formed of a single elongated strip of resilient sheet material of a length substantially greater than the circumference of said coupling flanges having a longitudinal flange at each longitudinal edge thereof comprising a plurality of segments, each having one edge portion offset with respect to the edge portion of the next adjacent segment, providing for automatic overlapping of said edge portions upon rolling of said strip into circular form around a pipe coupling, said edge portions being spaced apart a distance greater than the distance between the outer side faces of said coupling flanges, said longitudinal flanges terminating short of one end of said body portion, and the ends of said body portion being formed to overlap each other when the strip is rolled into circular form, and means for separably fastening said ends in such overlapping relation.

2. A leakage interceptor as defined in claim 1 wherein the last-named means includes at least one slot extending longitudinally of the second-mentioned end of the strip and a headed fastener element screw-threaded into the other end of said strip and projecting through said slot.

3. A leakage interceptor for a pipe joint having coupling flanges with circumferential surfaces, comprising a body portion formed of a single elongated strip of resilient sheet material of a length substantially greater than the circumference of said coupling flanges having a longitudinal flange at each longitudinal edge thereof comprising a plurality of segments, each having one edge portion offset with respect to the edge portion of the next adjacent segment, providing for automatic overlapping of said edge portions upon rolling of said strip into circular form around a pipe coupling, said edge portions being spaced apart a distance greater than the distance between the outer side faces of said coupling flanges, said longitudinal flanges terminating short of one end of said body portion, and the ends of said body portion being formed to overlap each other when the strip is rolled into circular form, means for separably fastening said ends in such overlapping relation, including at least one slot extending longitudinally of the second-mentioned end of said strip and a headed fastener element screw threaded into the other end of said strip and projecting through said slot, and a plurality of rods mounted in and extending between said longitudinal flanges in equidistantly spaced parallel relation to said body portion and spaced apart circumferentially of said body portion to contact with the circumferential surfaces of said coupling flanges for holding the body portion in spaced coaxial relation to said coupling flanges.

References Cited in the file of this patent

UNITED STATES PATENTS

| | | |
|---|---|---|
| 1,237,003 | Weston | Aug. 14, 1917 |
| 1,510,483 | Lang | Oct. 7, 1924 |
| 1,818,858 | McAlees | Aug. 11, 1931 |
| 1,896,225 | Dyer | Feb. 7, 1933 |
| 2,035,221 | Cleghorn | Mar. 24, 1936 |
| 2,699,960 | Callery | Jan. 18, 1955 |
| 2,728,982 | Merrill | Jan. 3, 1956 |

FOREIGN PATENTS

| | | |
|---|---|---|
| 14,404 | Great Britain | June 23, 1906 |

UNITED STATES PATENT OFFICE
CERTIFICATE OF CORRECTION

Patent No. 3,113,790                      December 10, 1963

Roy A. Matthiessen

It is hereby certified that error appears in the above numbered patent requiring correction and that the said Letters Patent should read as corrected below.

Column 3, line 36, and column 4, line 14, for "edge portions", each occurrence, read -- longitudinal flanges --.

Signed and sealed this 5th day of May 1964.

(SEAL)
Attest:
ERNEST W. SWIDER

Attesting Officer                              EDWARD J. BRENNER
                                                   Commissioner of Patents